E. T. MALLOY.
CASTER.
APPLICATION FILED MAY 8, 1919.

1,310,029.

Patented July 15, 1919.

Witness:
E. J. Geske

Inventor:
Edward T. Malloy
By James W. See
Attorney

UNITED STATES PATENT OFFICE.

EDWARD T. MALLOY, OF HAMILTON, OHIO.

CASTER.

1,310,029.  Specification of Letters Patent.  Patented July 15, 1919.

Application filed May 8, 1919. Serial No. 295,671.

*To all whom it may concern:*

Be it known that I, EDWARD T. MALLOY, a citizen of the United States, residing at Hamilton, Butler county, Ohio, have invented certain new and useful Improvements in Casters, of which the following is a specification.

This invention pertaining to furniture casters employed on trucks around such places as shoe factories, candy factories, etc., relates to improvements designed to prevent the clogging of the casters employed under the trucks used in transporting the product of the factory, and the improvements will be readily understood from the following description taken in connection with the accompanying drawing in which:—

Figure 1:
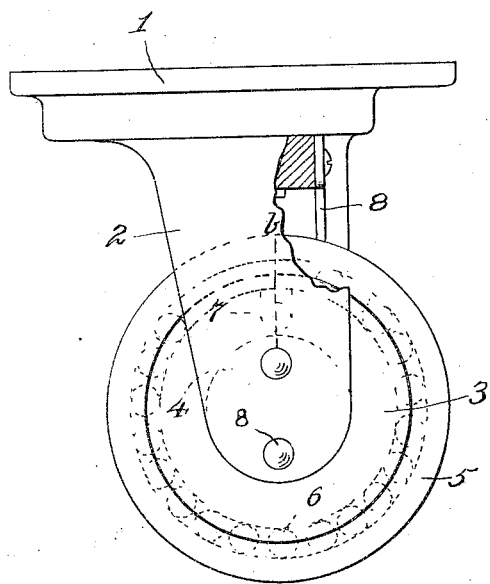
Figure 2:
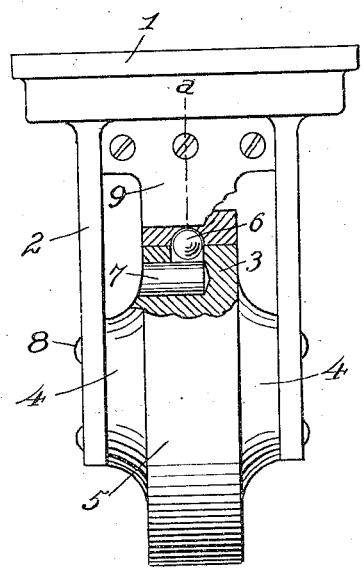

Figure 1 is a side elevation of a caster exemplifying my improvements, a portion of the housing appearing in vertical section in the plane of line $a$ of Fig. 2: and Fig. 2 a rear view of the caster, a part of the wheel appearing in vertical section in the plane of line $b$ of Fig. 1.

In the drawing:—

1, indicates the plate by means of which the caster is attached to the truck:

2, the housing swiveled to the plate on a vertical axis, as usual:

3, the center of the floor wheel having a width considerably less than the distance between the horns of the housing:

4, the hubs of the wheel center, projecting out sidewise from the wheel center and into contact with the inner surfaces of the housing-horns:

5, the loose tire of the wheel, the same having a width the same as that of the wheel center:

6, an annular series of anti-friction balls disposed around the wheel center and within the tire, the periphery of the wheel-center and the bore of the tire being provided with semi-circular grooves to form runways for the balls:

7, a plugged hole extending from one side of the wheel center inward and having communication with the ball-race in the periphery of the wheel center:

8, a plurality of rivets passing through the horns of the housing and through the wheel center and its hubs and serving to position the wheel center and prevent its rotation: and 9, a doctor secured to the housing and having its active edge engaging the periphery of the tire.

The hubs 4 are of such length as to leave considerable room between the wheel with its tire and the horns of the housing. In assembling the parts the series of balls is placed into the ball-race through the hole 7, which is later plugged to retain the balls.

During the advance of the caster the tire turns on the wheel center and any objects, such as waxed threads about the shoe factory, which the tire may pick up have plenty of passage room through the space between the horns of the housing above the wheel and at the sides of the wheel, there being no cramped spaces in which such waxed threads may become lodged. It is found practically impossible to cause the clogging of the wheel, or rather of its tire, where it runs on the wheel center, any waxed threads picked up by the tire shedding themselves downwardly upon the hubs of the wheel center and out through the free passages between the tire and the housing horns.

In candy factories the periphery of the rolling tire may be inclined to pick up gummed masses, but such masses are readily scraped from the periphery of the tire by the doctor and fall freely from the housing. In such places as shoe factories it is not necessary that the doctor be present. The series of balls not only act as anti-friction devices but, after they are inserted, they serve in preventing the sidewise displacement of the tire. The hole 7 in the wheel center should be of a size to permit the balls to be gotten, one by one, into the ball-race, and after the balls have been inserted the hole may be plugged with wood or metal or a firm cement which will form a completion of the groove in the wheel center, which groove would otherwise be interrupted by the communication leading from the hole 7 to the ball-race in the wheel center.

I claim:—

1. A caster comprising, a pair of separated housing horns, a wheel center narrower than the distance between horns, hubs projecting from the sides of the wheel center to the horns, means for preventing the rotation of the wheel center with reference to the housing, a tire disposed for rotation upon the wheel center and having a width substantially the same as that of the wheel center, and anti-friction devices interposed between the periphery of the wheel center and the interior of the tire, combined substantially as set forth.

2. A caster comprising, a pair of separated housing horns, a wheel center narrower than the distance between the horns, hubs projecting from the sides of the wheel center to the horns, means for preventing the rotation of the wheel center with reference to the housing, a tire disposed for rotation upon the wheel center and having a width substantially the same as that of the wheel center, the periphery of the wheel center and the bore of the tire being provided with grooves to form the race-way for a series of anti-friction balls, the wheel center being provided with a plugged hole communicating with the groove in its periphery, and a series of anti-friction balls disposed in the grooves of the tire and wheel center, combined substantially as set forth.

3. A caster comprising, a pair of separated housing horns, a wheel center narrower than the distance between the horns, hubs projecting from the sides of the wheel center to the horns, means for preventing the rotation of the wheel center with reference to the housing, a tire disposed for rotation upon the wheel center and having a width substantially the same as that of the wheel center, the periphery of the wheel center and the bore of the tire being provided with grooves to form the race-way for a series of anti-friction balls, the wheel center being provided with a plugged hole communicating with the groove in its periphery, a series of anti-friction balls disposed in the grooves of the tire and wheel center, and a doctor carried by the housing and engaging the periphery of the tire, combined substantially as set forth.

EDWARD T. MALLOY.

Witnesses:
  M. S. BELDEN,
  JNO. D. ANDREWS.

Copies of this patent may be obtained for five cents each, by addressing the "Commissioner of Patents, Washington, D. C."